US008501363B2

(12) United States Patent
Spencer

(10) Patent No.: US 8,501,363 B2
(45) Date of Patent: Aug. 6, 2013

(54) BIPOLAR PLATE DESIGN WITH IMPROVED FREEZE START-UP

(75) Inventor: Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 433 days.

(21) Appl. No.: 12/962,006

(22) Filed: Dec. 7, 2010

(65) Prior Publication Data

US 2012/0141901 A1 Jun. 7, 2012

(51) Int. Cl.
*H01M 2/38* (2006.01)
*H01M 2/40* (2006.01)
*H01M 8/24* (2006.01)
*H01M 8/04* (2006.01)
*H01M 4/64* (2006.01)

(52) U.S. Cl.
USPC ............................ 429/457; 429/514; 429/518

(58) Field of Classification Search
USPC .................. 429/454–457, 512–514, 517–522
See application file for complete search history.

(56) References Cited

U.S. PATENT DOCUMENTS

| 5,763,113 | A | 6/1998 | Meltser et al. | |
|---|---|---|---|---|
| 2006/0110642 | A1* | 5/2006 | Sugiura et al. | 429/26 |
| 2006/0204807 | A1* | 9/2006 | Kosaka et al. | 429/26 |
| 2009/0042075 | A1* | 2/2009 | Nakanishi et al. | 429/26 |
| 2009/0286133 | A1* | 11/2009 | Trabold et al. | 429/34 |

* cited by examiner

*Primary Examiner* — Carlos Barcena
(74) *Attorney, Agent, or Firm* — Fraser Clements Martin & Miller LLC; J. Douglas Miller

(57) ABSTRACT

A fuel cell plate is disclosed, the fuel cell plate including a first unipolar plate, a second unipolar plate cooperating with the first unipolar plate to form a bipolar plate having a coolant inlet, a coolant outlet, a reactant inlet, and a reactant outlet, and a coolant flow channel in fluid communication with the coolant inlet formed intermediate the first unipolar plate and the second unipolar plate, the coolant flow channel having a second portion disposed between a first portion and a third portion thereof adjacent to the reactant outlet, wherein the second portion is spaced apart from the reactant inlet at a first distance and the first portion and the third portion are each spaced apart from the reactant inlet at a distance greater than the first distance.

20 Claims, 4 Drawing Sheets

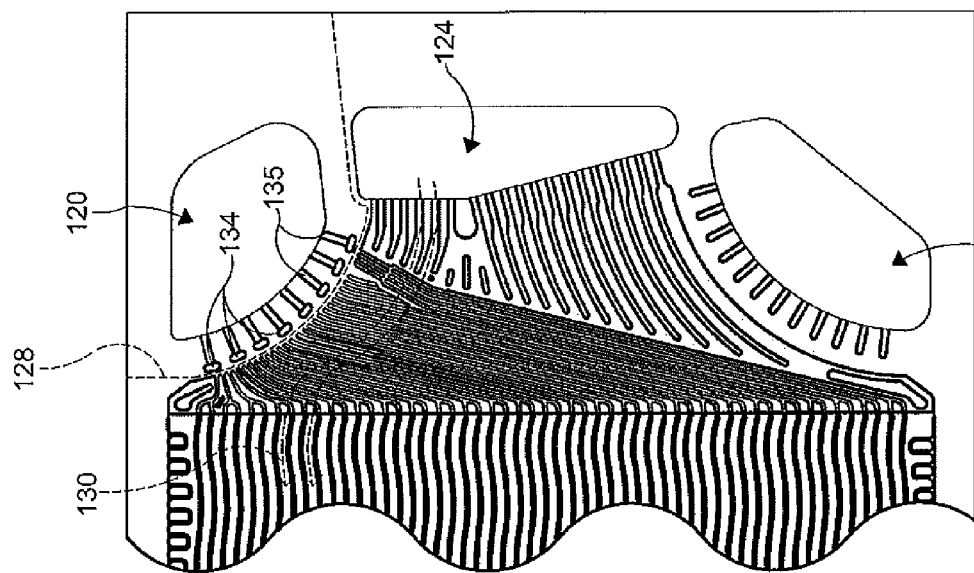
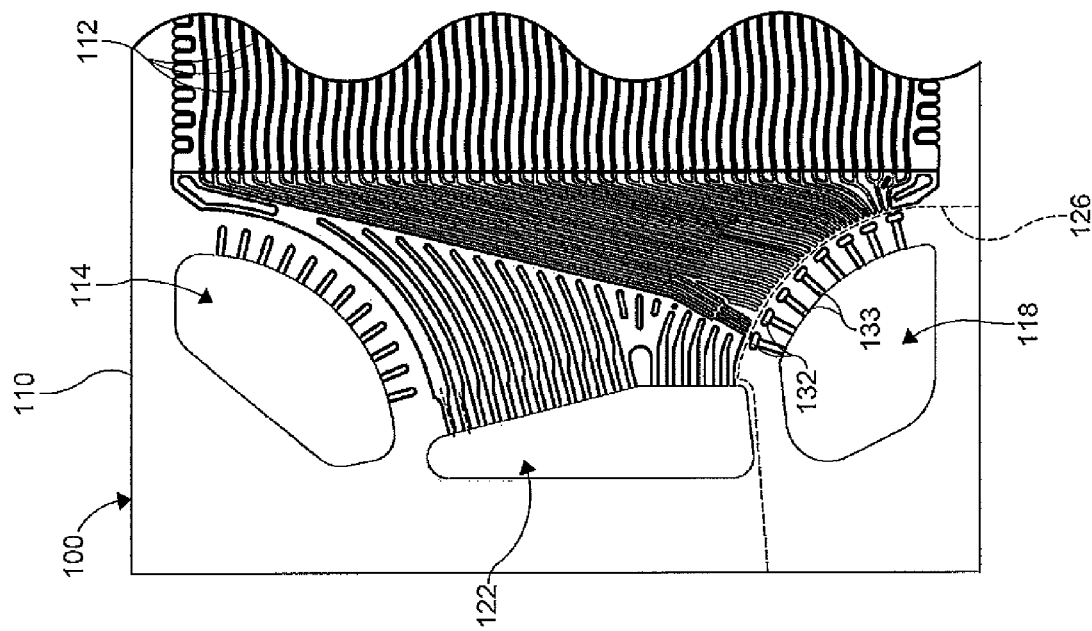
FIG. 1
(PRIOR ART)

BIPOLAR PLATE DESIGN WITH IMPROVED FREEZE START-UP

FIELD OF THE INVENTION

The invention relates to a fuel cell plate assembly, and more particularly to a bipolar fuel cell plate assembly formed from a first unipolar plate and a second unipolar plate cooperating to form coolant flow channels therebetween, one of the coolant flow channels having a second portion disposed between a first portion and a third portion, the second portion disposed adjacent a reactant outlet or a reactant outlet and a reactant inlet of the bipolar fuel cell plate assembly.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen (or a gas containing hydrogen) is supplied to an anode side of the fuel cell and oxygen is supplied as an oxidant to a cathode side. The oxygen can be either a pure oxygen ($O_2$) or air. The oxidant and hydrogen may be referred to separately as a "reactant" or collectively as the "reactants". PEM fuel cells include a membrane electrode assembly (MEA) having a thin, proton transmissive, non-electrically conductive, solid polymer electrolyte membrane having the anode catalyst on one face and the cathode catalyst on the opposite face. If a diffusion medium (DM) and/or a barrier layer is bonded to the MEA and optionally sealed with a gasket as a unit, the unit is known as a unitized electrode assembly (UEA). To form a single fuel cell, a MEA or a UEA is disposed between a unipolar plate assembly or a bipolar plate assembly.

Bipolar plates include an anode side and a cathode side for adjacent fuel cells in the fuel cell stack. FIG. 1 illustrates an anode side 100 of a fuel cell plate 110 as known in the art. The fuel cell plate 110 is formed from a pair of unipolar plates coupled together by a welding process, or an adhering process, for example. Flow channels 112 are provided on the anode side 100 of the fuel cell plate 110 to facilitate the flow of hydrogen to the anode side 100 of each MEA or UEA. Flow channels are provided in the cathode side of the fuel cell plate 110 to facilitate the flow of oxygen to the cathode side of the MEA or UEA. The fuel cell plate 110 is made of a conductive material, such as a coated or treated stainless steel, so that the fuel cell plate 110 may conduct the electricity generated by the fuel cells. Additionally, the unipolar plates forming the bipolar fuel cell plate 110 define coolant flow channels (not shown) therebetween to facilitate the flow of a cooling fluid therethrough to control the temperature of the fuel cell plate 110 during use. Cooling fluid flowing through the coolant flow channels may warm up the fuel cell plate 110 during a startup process in below-freezing conditions. The coolant flow channels are typically parallel to the flow channels 112 formed on the anode side 100 and the cathode side of the fuel cell plate 110 within an active area of the cell.

The fuel cell plate 110 includes an inlet aperture 118 and an outlet aperture 120 to facilitate the flow of the hydrogen across the fuel cell plate 110. The fuel cell plate 110 also includes an inlet aperture 116 and an outlet aperture 114 to facilitate the flow of the oxygen across the fuel cell plate 110. The fuel cell plate 110 also includes a coolant inlet 124 and a coolant outlet 122 to facilitate the flow of coolant between the unipolar plates forming the fuel cell plate 110. A plurality of individual fuel cell plates like the fuel cell plate 110 of FIG. 1 is typically bundled together to form a fuel cell stack. The inlet apertures, 116, 118, 124 of each of the fuel cell plates 110 cooperate to form an oxygen inlet manifold, a hydrogen inlet manifold, and a coolant inlet manifold, respectively, and the outlet apertures 114, 120, 122 of each of the fuel cell plates 110 cooperate to form an oxygen outlet manifold, hydrogen outlet manifold and a coolant outlet manifold, respectively. A weld seam 126 formed between the inlet aperture 118 and the coolant outlet 122 and a weld seam 128 formed between the outlet aperture 120 and the coolant inlet 124 each forms a fluid tight seal between the inlet aperture 118 and the coolant flow channels, and between the outlet aperture 120 and the coolant flow channels. Additional weld seams (not shown) may be formed between the unipolar plates of the fuel cell plate 110 to create a hermetically sealed coolant section and to militate against the loss of the reactant and/or the coolant to the atmosphere.

In use, coolant is caused to flow through the coolant manifold and into the coolant inlet 124 of each of the fuel cell plates 110 of the fuel cell stack. The coolant is caused to flow through the coolant flow channels formed between the unipolar plates. The pressure of the coolant is sufficient to cause the coolant to flow into each coolant flow channel that is parallel to the flow channels 112. The flow of coolant is shown generally by arrows 130.

The fuel cell plates 110 of the stack are commonly arranged in electrical series. Each cell within the stack may include a UEA, and each UEA provides an increment of voltage. A group of adjacent cells within the stack is referred to as a cluster. A typical arrangement of multiple cells in a stack is shown and described in commonly owned U.S. Pat. No. 5,763,113, hereby incorporated herein by reference in its entirety.

After the fuel cell stack has been in operation and subsequently powered down in freezing atmospheric conditions, condensation in the flow channels 112 of the fuel cell plates 110 may form ice. The ice may accumulate in the flow channels 112 and in inlet ports 132, inlet tunnels 133, in outlet ports 134, and outlet tunnels 135. The inlet ports 132 are in fluid communication with the inlet tunnels 133 formed intermediate the unipolar plates that provide fluid communication between the inlet aperture 118 and the flow channels 112. The outlet ports 134 are in fluid communication with the outlet tunnels 135 formed intermediate the unipolar plates that provide fluid communication between the outlet aperture 120 and the flow channels 112. When the fuel cell stack is powered up in the freezing conditions, ice formed in the flow channels 112, the ports 132, 134, and the tunnels 133, 135 must be melted before the reactants may flow across the fuel cell plates 110. Once the ice has melted, the fuel cell stack may function properly and efficiently. Coolant at a temperature greater than freezing flowing through the inlet aperture 124 of each plate 110 of the stack will eventually melt the ice in the ports 132, 134 and the tunnels 133, 135 to facilitate the flow of reactant therethrough, thereby facilitating the startup of the fuel cell stack. An amount of time required to melt the ice in the ports 132, 134 and the tunnels 133, 135 with the flow of coolant will delay the startup and efficient operation of the fuel cell stack. To hasten the amount of time, an auxiliary heater may be used to increase a temperature of the coolant, thereby increasing a cost and a complexity of the fuel cell stack.

It would be desirable to develop a fuel cell plate having a coolant flow channel formed therein, at least a portion of the coolant flow channel disposed adjacent a reactant inlet to facilitate a melting of ice formed on the fuel cell plate and to minimize a startup time of a fuel cell stack incorporating the fuel cell plate.

SUMMARY OF THE INVENTION

Concordant and congruous with the present invention, a fuel cell plate having a coolant flow channel formed therein, at least a portion of the coolant flow channel disposed adjacent a reactant inlet to facilitate a melting of ice formed on the fuel cell plate and to minimize a startup time of a fuel cell stack incorporating the fuel cell plate, has surprisingly been discovered.

In one embodiment, a fuel cell plate comprises a first unipolar plate having flow channels formed on a surface thereof; a second unipolar plate having flow channels formed on a surface thereof and joined with said first unipolar plate, said first unipolar plate and said second unipolar plate cooperating to form a bipolar plate having a coolant inlet, a coolant outlet, a reactant inlet, and a reactant outlet; and a coolant flow channel formed intermediate said first unipolar plate and said second unipolar plate in fluid communication with the coolant inlet, said coolant flow channel having a first portion, a second portion, and a third portion, the second portion disposed between the first portion and the third portion adjacent the reactant outlet, wherein the second portion is spaced apart from the reactant outlet at a first distance and the first portion and the third portion are each spaced apart from the reactant outlet at a distance greater than the first distance.

In another embodiment, a fuel cell plate comprises a first unipolar plate having flow channels formed on a surface thereof; a second unipolar plate having flow channels formed on a surface thereof and joined with said first unipolar plate, said first unipolar plate and said second unipolar plate cooperating to form a bipolar plate having a coolant inlet, a coolant outlet, a reactant inlet, and a reactant outlet; and a coolant flow channel formed intermediate said first unipolar plate and said second unipolar plate in fluid communication with the coolant inlet, said coolant flow channel having a first portion, a curvilinear second portion, and a third portion, the curvilinear second portion disposed between the first portion and the third portion adjacent the reactant outlet, wherein the curvilinear second portion is spaced apart from the reactant outlet at a first distance and the first portion and the third portion are each spaced apart from the reactant outlet at a distance greater than the first distance.

In another embodiment, a fuel cell plate comprises a first unipolar plate; a second unipolar plate cooperating with said first unipolar plate to form a bipolar plate having a coolant inlet, a coolant outlet, a reactant inlet, and a reactant outlet; and a coolant flow channel formed intermediate said first unipolar plate and said second unipolar plate in fluid communication with the coolant inlet, said coolant flow channel having a first portion, a second portion, and a third portion, the second portion disposed between the first portion and the third portion adjacent the reactant inlet, wherein the second portion is spaced apart from the reactant inlet at a first distance and the first portion and the third portion are each spaced apart from the reactant inlet at a distance greater than the first distance.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a fragmentary top plan view of a fuel cell plate known in the prior art;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 2:
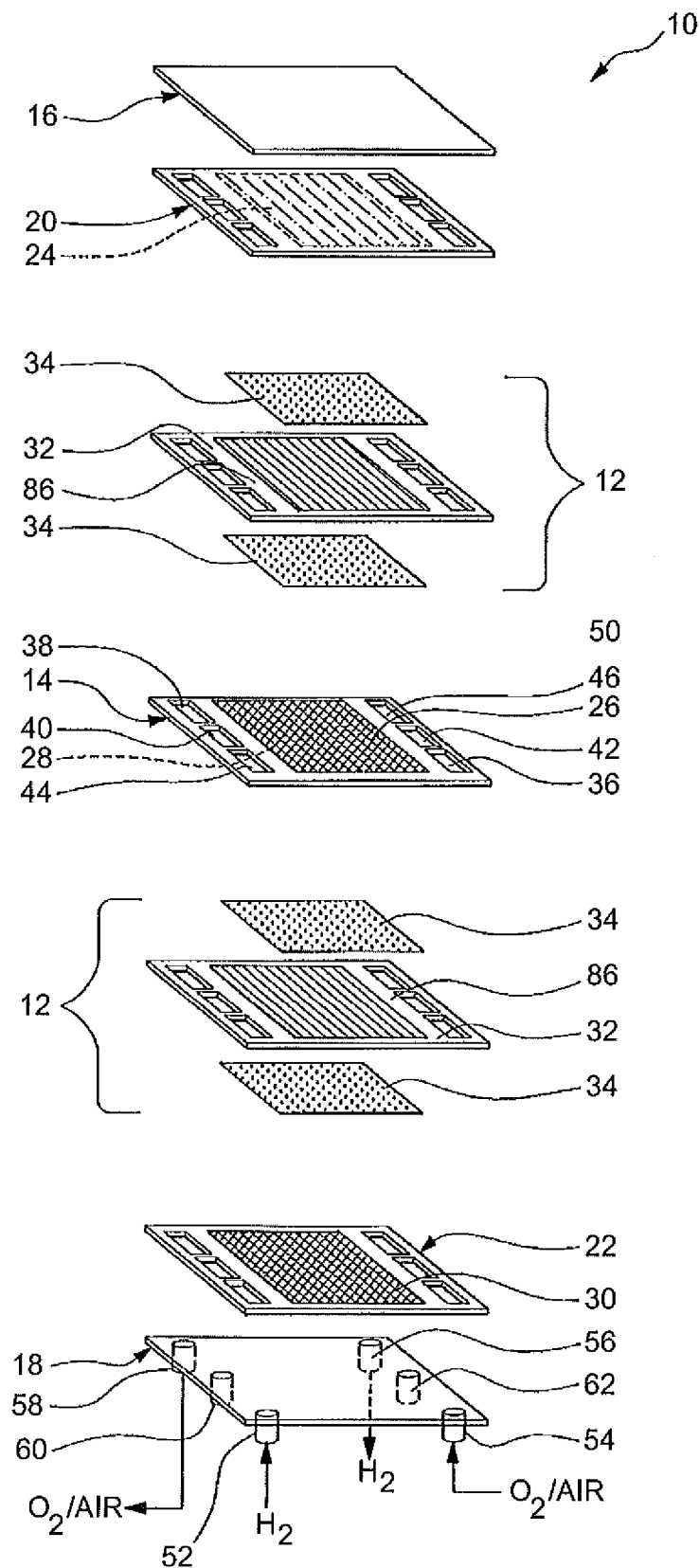
FIG. 2 is an exploded perspective view of a fuel cell stack according to an embodiment of the invention.

FIG. 2 depicts a fuel cell stack 10 having a pair of membrane electrode assemblies 12 separated from each other by an electrically conductive bipolar plate 14. For simplicity, only a two-cell stack (i.e. one bipolar plate) is illustrated and described in FIG. 2, it being understood that a typical fuel cell stack 10 will have many more cells and bipolar plates.

The membrane electrode assemblies 12 and bipolar plate 14 are stacked together between a pair of clamping plates 16, 18 and a pair of unipolar end plates 20, 22. The clamping plates 16, 18 are electrically insulated from the end plates 20, 22 by a seal or a dielectric coating (not shown). The unipolar end plate 20, both working faces of the bipolar plate 14, and the unipolar end plate 22 include respective active areas 24, 26, 28, 30. The active areas 24, 26, 28, 30 are typically flow fields for distributing gaseous reactants for example, and oxygen or air over a cathode, and hydrogen over an anode, of the membrane electrode assemblies 12. The hydrogen and oxygen/air may be referred to separately as a "reactant" or collectively as the "reactants".

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer.

A plurality of nonconductive gaskets 32, which may be a component of the membrane electrode assemblies 12, militates against fuel cell leakage and provides electrical insulation between the several components of the fuel cell stack 10. Gas-permeable diffusion media 34 are disposed adjacent the membrane electrode assemblies 12. The end plates 20, 22 are also disposed adjacent the diffusion media 34, respectively, while the active areas 26, 28 of the bipolar plate 14 are disposed adjacent the diffusion media 34.

Figure 3:
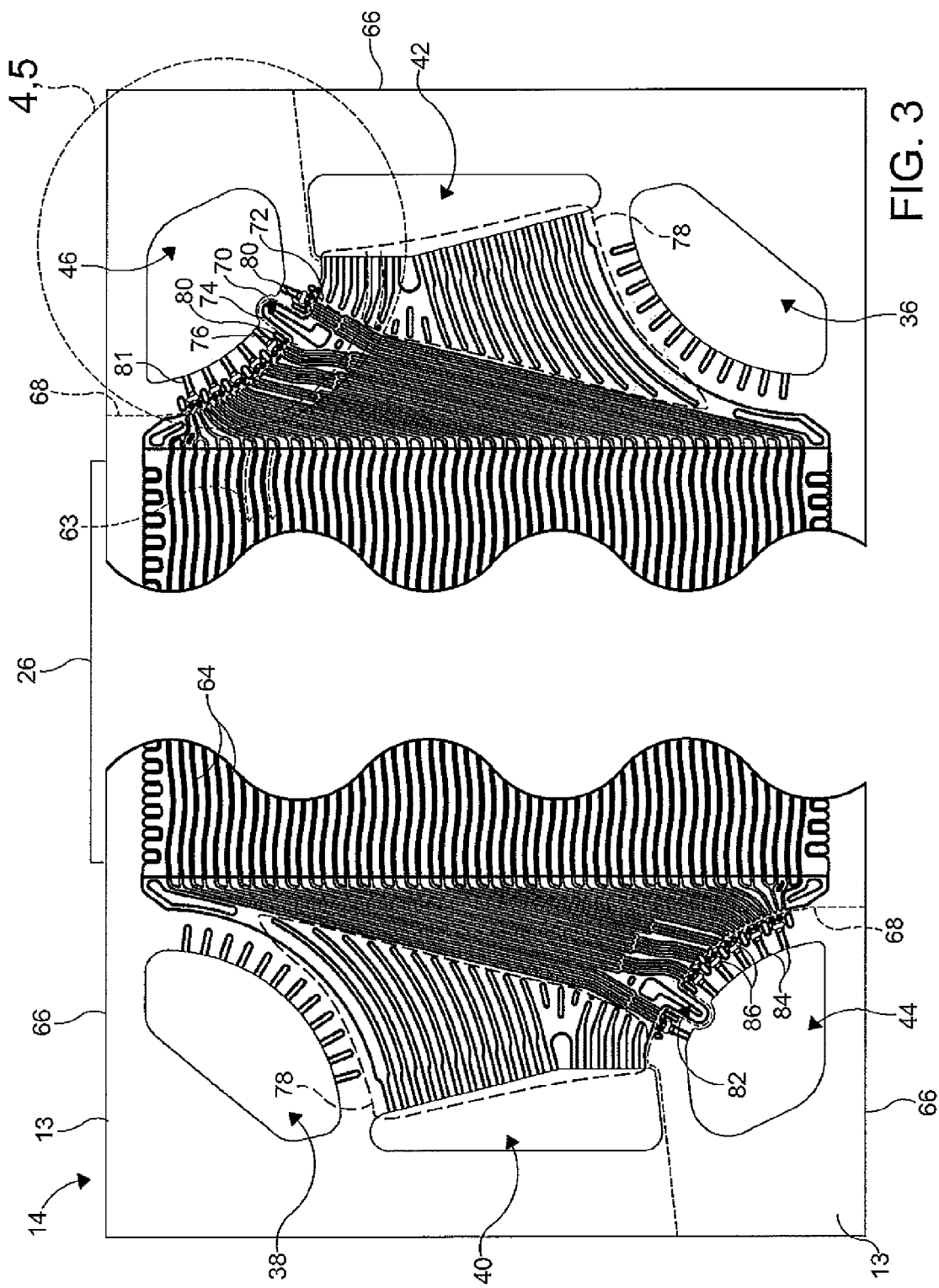
FIG. 3 is a fragmentary top plan view of a fuel cell plate of the fuel cell stack illustrated in FIG. 2.

The bipolar plate 14, unipolar end plates 20, 22, and the membrane electrode assemblies 12 each includes a cathode inlet 36 and a cathode outlet 38, a coolant inlet 42 and a coolant outlet 40, and an anode inlet 44 and an anode outlet 46. As best shown in FIG. 3, the configuration of the inlets 36, 46 and the outlets 38, 44 is one of a counterflow configuration. It is understood that the inlets 36, 46 may be disposed on an end of the fuel cell plate 14 and the outlets 38, 44 may be disposed on another end of the fuel cell plate 14 for a parallel-flow configuration. Supply manifolds and exhaust manifolds of the fuel cell stack 10 are formed by an alignment of the respective apertures 36, 38, 40, 42, 44, 46 in the bipolar plate 14, unipolar end plates 20, 22, and the membrane electrode assemblies 12. The hydrogen gas is supplied to an anode supply manifold via an anode inlet conduit 52. The air is supplied to a cathode supply manifold of the fuel cell stack 10 via a cathode inlet conduit 54. An anode outlet conduit 56 and a cathode outlet conduit 58 are also provided for an anode exhaust manifold and a cathode exhaust manifold, respectively. A coolant inlet conduit 62 is provided for supplying liquid coolant to a coolant supply manifold. A coolant outlet conduit 60 is provided for removing coolant from a coolant exhaust manifold. It should be understood that the configurations of the various inlets 52, 54, 62 and outlets 56, 58, 60 in FIG. 2 are for the purpose of illustration, and other configurations may be chosen as desired.

Figure 4:
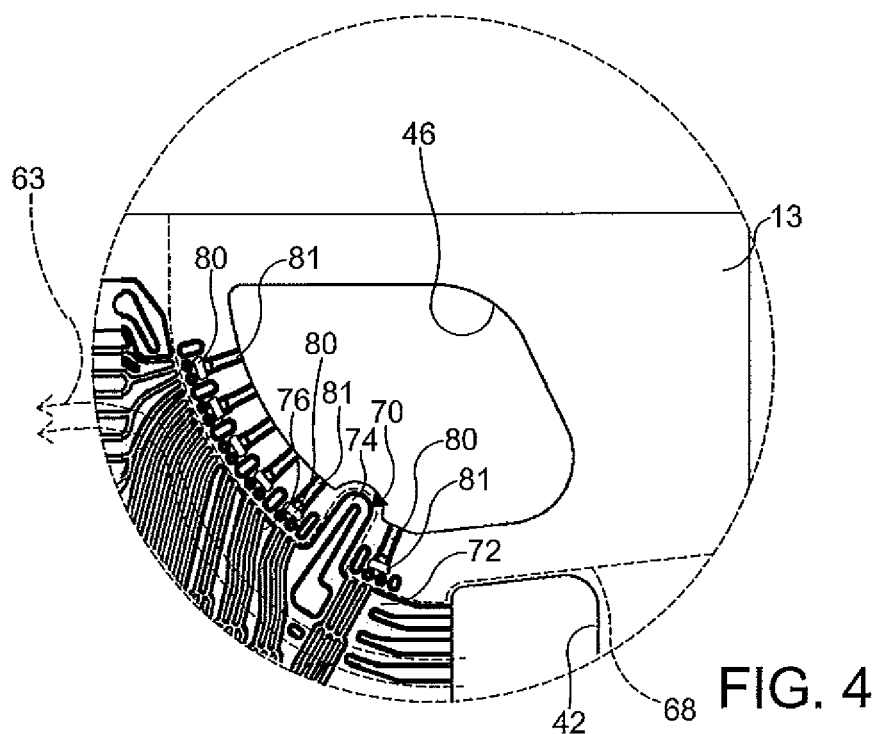
FIG. 4 is an enlarged fragmentary top plan view of the fuel cell plate illustrated in FIG. 3.
Figure 5:
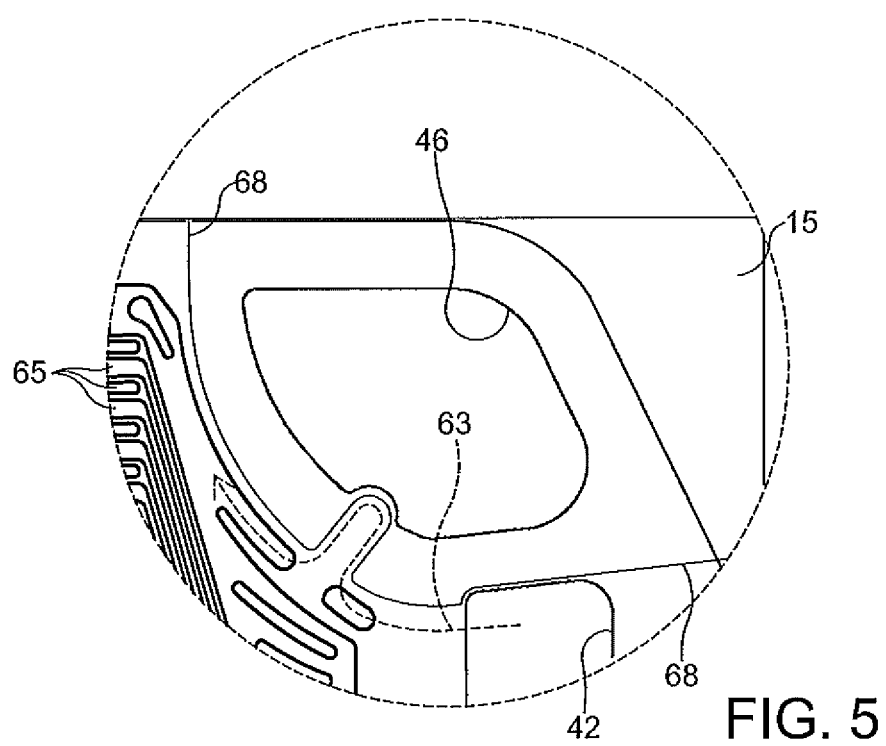
FIG. 5 is an enlarged fragmentary top plan view of the fuel cell plate illustrated in FIG. 3 with a unipolar plate removed to show a coolant flow channel according to an embodiment of the invention.

The bipolar plate 14 of FIG. 2 is shown in more detail in FIGS. 3-5. The bipolar plate 14 is formed from a pair of unipolar plates 13, 15. The bipolar plate 14 includes a plurality of flow channels 64 formed thereon. In the active area 26, the flow channels 64 are undulated. Outside of the active area 26, the flow channels 64 are substantially linear and provide a flow of reactant from the anode inlet 44 to the active area 26, and from the active area 26 to the anode outlet 46. It is understood that the flow channels 64 of the active area 26 may be substantially linear, serpentine, or have other configurations, as desired. The peripheral edges 66 of the unipolar plates 13, 15 are joined together to form the bipolar plate 14. The unipolar plates 13, 15 may be bonded together by any conventional means such as by welding, the application of an adhesive, and the use of an elastomeric seam, for example. By joining the unipolar plates 13, 15 together, coolant flow channels 65 are formed intermediate the unipolar plates 13, 15. In the active area 26, the coolant flow channels are substantially parallel to the flow channels 64. Outside of the active area 26, a portion of the coolant flow channels 78 is adapted to provide a flow of coolant from the coolant inlet 40 to the coolant flow channels of the active area 26, and from the coolant flow channels of the active area 26 to the coolant outlet 42. The portion of the coolant flow channels 78 outside of the active area 26 may have any shape desired, such as linear, arcuate, and undulated, for example, to facilitate the flow of coolant from the coolant inlet 40 and the coolant outlet 42 to the coolant flow channels 65 in the active area 26. Weld seams 68 formed between the anode inlet 44 and the flow channels 64 and between the anode outlet 46 and the flow channels form a fluid tight seal between the anode inlet 44 and the coolant flow channels and between the anode outlet 26 and the coolant flow channels. The weld seams 68 further facilitate the joining together of the unipolar plates 13, 15 to form the bipolar plate 14. It is understood that the weld seams 68 are seals, and that the weld seams 68 may be adhesive seals, elastomeric seals or metalurgical seals, as desired. As explained in more detail hereinbelow, the weld seams 68 have a shape substantially similar to the shape of a coolant flow channel 70. It is understood that the weld seams may have any shapes desired. Additional weld seams (not shown) may be formed between the unipolar plates 13, 15 of the fuel cell plate 14 to create a hermetically sealed coolant section and to militate against the loss of the reactant and/or the coolant to the atmosphere.

The coolant flow channel 70 is formed outside of the active area 26. As best shown in FIGS. 4 and 5, the coolant flow channel 70 is the coolant flow channel 65 that is disposed nearest the anode outlet 46. The coolant flow channel 70 includes a first portion 72, a second portion 74, and a third portion 76. The second portion 74 is disposed between the first portion 72 and the third portion 76. As best shown in FIG. 4, the first portion 72 and the third portion 76 are substantially linear. The second portion 74 is substantially curvilinear having a generally u-shape. The second portion 74 may have a rectilinear shape, a v-shape, or any other shape, as desired. At least a portion of the second portion 74 of the coolant flow channel 70 is disposed between inlet ports 80 formed in the bipolar plate 14. The portions 72, 74, 76 of the coolant flow channel 70 are formed in the unipolar plate 13. The coolant flow channel 70 is formed by the cooperation of the unipolar plate 13 and the unipolar plate 15. It is understood that the portions 72, 74, 76 may be formed in the unipolar plate 15, or one or more of the portions 72, 74, 76 may be formed in the unipolar plate 15 while the remaining portions are formed in the unipolar plate 13.

Favorable results have been obtained with a fuel cell plate 14 having a second portion 74 formed as close to the outlet ports 80 as possible with only the weld seam 68 therebetween. The outlet ports 80 facilitate fluid flow from the flow channels 64, through the tunnels 81 formed intermediate the unipolar plates 13, 15 and to the anode outlet 46. At least a portion of the second portion 74 is formed in the bipolar plate 14 a first distance from the anode outlet 46. The first portion 72 and the third portion 76 are formed in the bipolar plate 14 at a distance from the anode outlet 46 greater than the first distance. It is understood that the coolant flow channel 70 may include a fourth portion (not shown) disposed between the first portion 72 and the third portion 76 and having a shape substantially similar to the shape of the second portion 74.

A second coolant flow channel 82 substantially identical to the coolant flow channel 70 is formed in the bipolar plate 14 outside of the active area 26. The second coolant flow channel 82 is the coolant flow channel nearest the anode inlet 44. It is understood that the bipolar plate 14 may include only one of the coolant flow channel 70 and the second coolant flow channel 82, and that the coolant flow channels 70, 82 may have the same shape or different shapes, as desired.

In use, coolant is caused to flow from a source (not shown) through the coolant inlet conduit 60 of the fuel cell stack 10. Coolant is caused to flow from the coolant inlet conduit 60 into the coolant inlet 42 of the bipolar plate 14. The flow of coolant is shown generally by arrows 63. Coolant is caused to flow through the portion of the coolant flow channels 78 to the coolant flow channels in the active area 26 of the bipolar plate 14. Coolant is also caused to flow from the coolant inlet 42 and into the coolant flow channel 70. The coolant is then caused to flow through the second portion 74 and the third portion 76 of the coolant flow channel 70 and then to the coolant flow channels of the active area 26. During a startup operation of the fuel cell stack 10 in below-freezing conditions, the coolant caused to flow through the second portion 74 of the coolant flow channel 70 transfers thermal energy to the reactant flowing through the anode outlet 46, from the tunnels 81 and the ports 80 adjacent to the second portion of the coolant flow channel 70, thereby increasing a temperature of the reactant. By increasing the temperature of the reactant in the anode outlet 46, ice formed in the flow channels 64 or in the ports 80 and the tunnels 81 is caused to melt and the flow of reactant through the ports 80 and the tunnels 81 is maximized, thereby minimizing a startup time of the fuel cell stack 10 and maximizing the efficiency of operation of the fuel cell stack 10. Similar to the coolant flow channel 70, coolant caused to flow through the second coolant flow channel 82 during a startup operation of the fuel cell stack 10 in below-freezing conditions transfers thermal energy to the reactant flowing through the anode inlet 44, thereby increasing a temperature of the reactant. By increasing the temperature of the reactant in the anode inlet 44, ice formed in the flow channels 64 or in the ports 86 or in the tunnels 84 is caused to melt and the flow of reactant through the ports 86 is maximized, thereby minimizing a startup time of the fuel cell stack 10 and maximizing the efficiency of operation of the fuel cell stack 10. The coolant also transfers thermal energy to the pair of ports 86 disposed adjacent a second portion of the second coolant flow channel 82, to cause any ice in the pair of ports 86 to melt, thereby maximizing the flow of reactant through the pair of ports 86, minimizing a startup time of the fuel cell stack 10, and maximizing the efficiency of operation of the fuel cell stack 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A bipolar fuel cell plate comprising:
   a first unipolar plate having flow channels formed on a surface thereof;
   a second unipolar plate having flow channels formed on a surface thereof and joined with said first unipolar plate, said first unipolar plate and said second unipolar plate cooperating to form a bipolar plate having a coolant inlet, a coolant outlet, a reactant inlet, and a reactant outlet;
   a plurality of ports formed in each of said first unipolar plate and said second unipolar plate adjacent at least one of the reactant inlet and the reactant outlet for providing fluid communication between the at least one of the reactant inlet and the reactant outlet and the flow channels formed on said first unipolar plate and said second unipolar plate; and
   a coolant flow channel formed intermediate said first unipolar plate and said second unipolar plate in fluid communication with the coolant inlet, said coolant flow channel having a first portion, a second portion, and a third portion, the second portion disposed between the first portion and the third portion adjacent the reactant outlet with at least a portion of the second portion disposed between a pair of the plurality of the ports.

2. The bipolar fuel cell plate of claim 1, wherein the second portion of said coolant flow channel is one of a curvilinear portion and a rectilinear portion.

3. The bipolar fuel cell plate of claim 2, wherein the second portion is substantially u-shaped.

4. The bipolar fuel cell plate of claim 2, wherein the first portion and the third portion are one of substantially linear and arcuate.

5. The bipolar fuel cell plate of claim 1, further comprising a seal disposed between said first unipolar plate and said second unipolar plate to provide a fluid tight seal between the reactant inlet and said coolant flow channel.

6. The bipolar fuel cell plate of claim 5, wherein said seal is one of a weld seam, an adhesive seam, and an elastomeric seam.

7. The bipolar fuel cell plate of claim 1, further including a second coolant flow channel formed intermediate said first unipolar plate and said second unipolar plate in fluid communication with the coolant outlet, said second coolant flow channel having a first portion, a second portion, and a third portion, the second portion disposed between the first portion and the third portion thereof adjacent the reactant inlet, wherein the second portion is spaced apart from the reactant inlet at a first distance and the first portion and the third portion are each spaced apart from the reactant inlet at a distance greater than the first distance.

8. The bipolar fuel cell plate of claim 7, wherein the second portion of said second coolant flow channel is one of a curvilinear portion and a rectilinear portion.

9. A bipolar fuel cell plate comprising:
   a first unipolar plate having flow channels formed on a surface thereof;
   a second unipolar plate having flow channels formed on a surface thereof and joined with said first unipolar plate, said first unipolar plate and said second unipolar plate cooperating to form a bipolar plate having a coolant inlet, a coolant outlet, a reactant inlet, and a reactant outlet;
   a plurality of ports formed in each of said first unipolar plate and said second unipolar plate adjacent at least one of the reactant inlet and the reactant outlet for providing fluid communication between the at least one of the reactant inlet and the reactant outlet and the flow channels formed on said first unipolar plate and said second unipolar plate; and
   a coolant flow channel formed intermediate said first unipolar plate and said second unipolar plate in fluid communication with the coolant inlet, said coolant flow channel having a first portion, a curvilinear second portion, and a third portion, the curvilinear second portion disposed between the first portion and the third portion adjacent the reactant outlet with at least a portion of the curvilinear second portion disposed between a pair of the plurality of the ports.

10. The bipolar fuel cell plate of claim 9, wherein the second portion of said coolant flow channel is one of a curvilinear portion and a rectilinear portion.

11. The bipolar fuel cell plate of claim 10, wherein the second portion is substantially u-shaped.

12. The bipolar fuel cell plate of claim 9, wherein the first portion and the third portion are one of substantially linear and arcuate.

13. The bipolar fuel cell plate of claim 9, further including a second coolant flow channel formed intermediate said first unipolar plate and said second unipolar plate in fluid communication with the coolant outlet, said second coolant flow channel having a first portion, a second portion, and a third portion, the second portion disposed between the first portion and the third portion thereof adjacent the reactant inlet, wherein the second portion is spaced apart from the reactant inlet at a first distance and the first portion and the third portion are each spaced apart from the reactant inlet at a distance greater than the first distance.

14. The bipolar fuel cell plate of claim 13, wherein the second portion of said second coolant flow channel is one of a curvilinear portion and a rectilinear portion.

15. A bipolar fuel cell plate comprising:
   a first unipolar plate having flow channels formed on a surface thereof;
   a second unipolar plate having flow channels formed on a surface thereof and joined with said first unipolar plate, said first unipolar plate and said second unipolar plate cooperating to form a bipolar plate having a coolant inlet, a coolant outlet, a reactant inlet, and a reactant outlet; and a coolant flow channel formed intermediate said first unipolar plate and said second unipolar plate in fluid communication with the coolant inlet, said coolant flow channel having a first portion, a second portion, and a third portion, the second portion disposed between the first portion and the third portion adjacent the reactant outlet spaced apart from the reactant outlet at a first distance and the first portion and the third portion are each spaced apart from the reactant outlet at a distance greater than the first distance;

a plurality of ports formed in each of said first unipolar plate and said second unipolar plate adjacent at least one of the reactant inlet and the reactant outlet for providing fluid communication between the at least one of the reactant inlet and the reactant outlet and the flow channels formed on said first unipolar plate and said second unipolar plate; and a weld seam disposed between said first unipolar plate and said second unipolar plate to provide a fluid tight seal between the reactant inlet and said coolant flow channel, wherein a portion of the second portion of the coolant flow channel is disposed as close to a pair of ports as possible with only the weld seam therebetween.

16. The bipolar fuel cell plate of claim 15, wherein the second portion of said coolant flow channel is one of a curvilinear portion and a rectilinear portion.

17. The bipolar fuel cell plate of claim 16, wherein the second portion is substantially u-shaped.

18. The bipolar fuel cell plate of claim 15, wherein the first portion and the third portion are one of substantially linear and arcuate.

19. The bipolar fuel cell plate of claim 15, further including a second coolant flow channel formed intermediate said first unipolar plate and said second unipolar plate in fluid communication with the coolant outlet, said second coolant flow channel having a first portion, a second portion, and a third portion, the second portion disposed between the first portion and the third portion thereof adjacent the reactant inlet, wherein the second portion is spaced apart from the reactant inlet at a first distance and the first portion and the third portion are each spaced apart from the reactant inlet at a distance greater than the first distance.

20. The bipolar fuel cell plate of claim 19, wherein the second portion of said second coolant flow channel is one of a curvilinear portion and a rectilinear portion.

* * * * *